(12) United States Patent
Seok et al.

(10) Patent No.: US 7,884,912 B2
(45) Date of Patent: Feb. 8, 2011

(54) LIQUID CRYSTAL DISPLAY DEVICE

(75) Inventors: Dae Young Seok, Daegu (KR); Moon Soo Kang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 205 days.

(21) Appl. No.: 12/285,163

(22) Filed: Sep. 30, 2008

(65) Prior Publication Data

US 2009/0091672 A1  Apr. 9, 2009

(30) Foreign Application Priority Data

Oct. 5, 2007 (KR) ...................... 10-2007-0100444

(51) Int. Cl.
G02F 1/1343 (2006.01)
(52) U.S. Cl. ...................... 349/141; 349/139
(58) Field of Classification Search .......... 349/139–141
See application file for complete search history.

(56) References Cited

U.S. PATENT DOCUMENTS

2006/0145990 A1    7/2006  Kim et al. ...................... 345/94
2006/0290863 A1   12/2006  HoeSup ...................... 349/141
2007/0296901 A1*  12/2007  Seo et al. ...................... 349/141

* cited by examiner

Primary Examiner—Hemang Sanghavi
(74) Attorney, Agent, or Firm—Morgan, Lewis & Bockius LLP

(57) ABSTRACT

Provided is a liquid crystal display device. The liquid crystal display device includes a pixel including at least two domains generating electric fields of different directions. A contact part disposed in the boundary between the domains electrically connects a common line with a common electrode. The common line is disposed in a pixel adjacent to the pixel, so that both a viewing angle and an aperture ratio can be improved.

11 Claims, 8 Drawing Sheets

LIQUID CRYSTAL DISPLAY DEVICE

BACKGROUND

The present disclosure relates to a liquid crystal display (LCD) device, and more particularly, to an LCD device that can secure a high aperture ratio.

As information telecommunication develops, a display device develops remarkably. The display device becomes an indispensable of modern people. An LCD among display devices includes a light source and an LC panel.

The light source provides light to the LC panel. The LC panel drives LCs using an electric field applied thereto. At this point, the LCD device displays an image by controlling light transmittance of light passing through the LC panel through the driving of the LCs. Here, since the LC has anisotropy in a refractive index, the LCD device has a narrow viewing angle.

To improve the viewing angle of the LCD device, the LCD device has been developed as an in-plane switching mode (IPS) LCD device in which pixel electrodes and common electrodes are alternately disposed to generate an electric field in a horizontal direction with respect to a substrate. However, since the pixel electrodes and the common electrodes are disposed in a pixel in the LCD device, an aperture ratio reduces.

SUMMARY

Embodiments provide a liquid crystal display device that can secure both a viewing angle and an aperture ratio.

In one embodiment, a liquid crystal display device includes: a plurality of pixels including at least first and second domains generating electric fields in different directions, respectively; a pixel electrode disposed in the first and second domains, of each pixel; a common electrode disposed in the first and second domains of each pixel and a boundary therebetween, and alternately disposed with a part of the pixel electrodes to generate a transverse electric field; a contact part electrically connected with the common electrode in a position corresponding to the boundary; and a common line electrically connected with the contact part and disposed in the adjacent pixel adjacent to the pixel where the contact part is disposed.

In another embodiment, a liquid crystal display device includes: a substrate including a plurality of pixels each having first and second domains; a contact part disposed at the n-th pixel of the plurality of pixels and disposed in a boundary between the first and second domains; a common line disposed on one side of the (n+1)-th pixel of the plurality of pixels and electrically connected with the contact part; a dielectric disposed on the substrate including the common line and the contact part; first pixel electrodes disposed with a predetermined interval on the dielectric, and disposed in the first and second domains, respectively, to have different slopes; a second pixel electrode electrically connecting the first pixel electrodes and overlapping the common line, the second pixel electrode being disposed on the dielectric; first common electrodes alternately disposed with the first pixel electrodes; a second common electrode disposed in a boundary between the first and second domains, and electrically connected with the contact part; and a third common electrode electrically connecting the first common electrodes with the second common electrode.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Though an LCD device according to an embodiment is described in detail with reference to the accompanying drawings, those skilled in the art would realize the present disclosure in various forms without departing from the scope and spirit of the present disclosure.

Figure 1A:
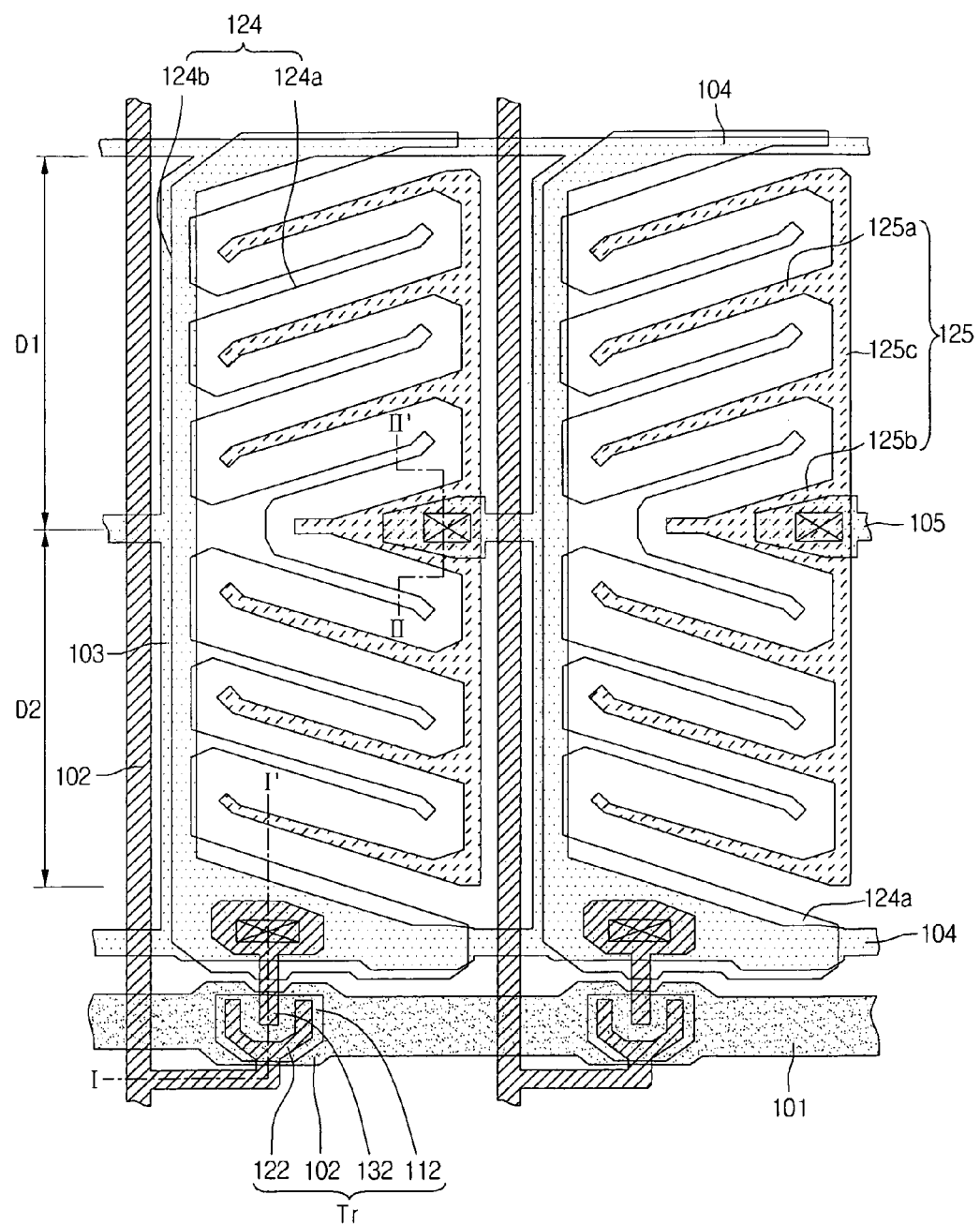
FIG. 1A is a plan view of an LCD device according to an embodiment.
Figure 1B:
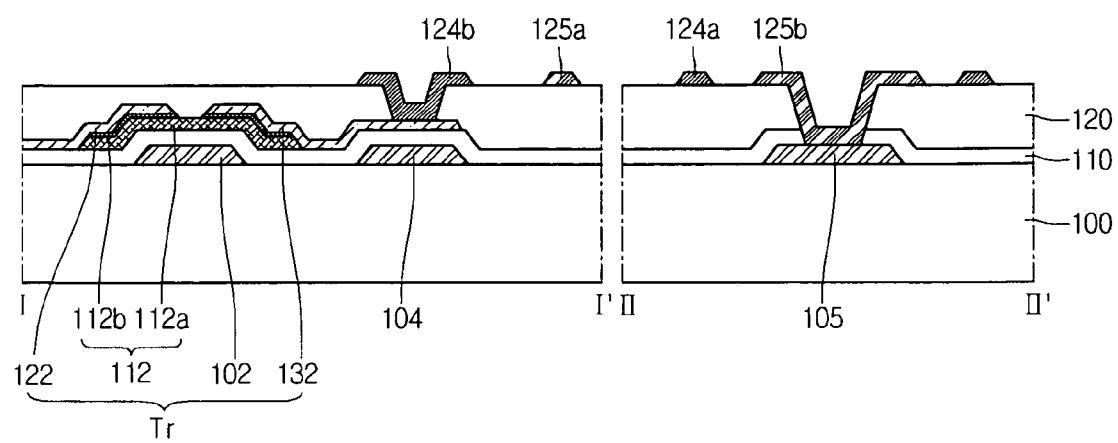
FIG. 1B is a cross-sectional view taken along lines I-I' and II-II' of FIG. 1A.

FIGS. 1A and 1B are views explaining an LCD device according to the embodiment. FIG. 1A is a plan view of the LCD device according to the embodiment, and FIG. 1B is a cross-sectional view taken along lines I-I' and II-II' of FIG. 1A.

Referring to FIGS. 1A and 1B, the LCD device includes a plurality of pixels for displaying an image.

Each pixel includes a first domain D1 and a second domain D2. The first and second domains D1 and D2 generate electric fields of different directions. For example, the first and second domains D1 and D2 generate electric fields whose directions are symmetric. Accordingly, liquid crystals disposed in the first and second domains D1 and D2 can be aligned to different directions to improve a viewing angle.

The each pixel can be defined on a substrate 100 by a gate line 101 and a data line 111 crossing each other. That is, the gate line 101 and the data line 111 can be disposed along each pixel. For example, in the case where the gate line 101 and the data line 111 cross each other perpendicularly, the each pixel can have a rectangular shape. At this point, the plurality of pixels can be disposed in a mesh configuration. The gate line 101 and the data line 111 are insulated from each other by a gate dielectric 110 interposed therebetween.

A common line 103 is disposed in the each pixel. The common line 103 can be disposed on one side of the each pixel. The common line 103 is parallel to the data line 111 and can have a predetermined interval. The common line 103 overlaps a second pixel electrode 124b which will be described later with a dielectric interposed to form storage capacitance. The dielectric can be a stacked layer of the gate insulating layer 110 and a passivation layer 120 which will be described later. The common line 103 is formed of the same material as that of the gate line 101 and can be disposed in the same layer where the gate line 101 is disposed.

A contact part 105 electrically connected with the common line 103 is disposed. The contact part 105 electrically connects the common line 103 with a common electrode 125 which will be described later. The contact part 105 is disposed on the boundary between the first and second domains D1 and D2 to prevent the aperture ratio of the LCD device from reducing. Here, the boundary between the first and second domains D1 and D2 includes a disclination region where the alignment of liquid crystal molecules scatters, so that the liquid crystals are not driven. Accordingly, the boundary between the first and second domains D1 and D2 serves as a non-transmission region which does not transmit light, i.e., a dead region. Therefore, the contact part 105 that does not transmit light is disposed in the dead region of the each pixel, so that reduction in the aperture ratio can be prevented.

In the case where the contact part 105 and the common line 103 are disposed in the same layer, the contact part 105 and the common electrode 125 can overlap each other. Accordingly, the step difference by the common line 103 increases. Here, in the case where an alignment process of LCs is performed in a horizontal direction with respect to the gate line 101, the neighborhood of the common line 103 may not be properly aligned in comparison with other regions due to the step difference by the common line 103. Accordingly, light leakage defect parallel to the common line 103, that is, a horizontal line defect may be generated.

To prevent the horizontal line defect caused by a rubbing defect, the contact part 105 is electrically connected with the common line 103 disposed in a pixel adjacent to the pixel. To achieve a compact and simple structure by reducing a contact path between the contact part 105 and the common line 103, the adjacent pixel can be a pixel adjacent to the contact part 105. For example, in the case where the contact part 105 is disposed in an n-th pixel, the contact part 105 can electrically contact a common line 103 disposed in an (n+1)-th pixel adjacent to the n-th pixel. Accordingly, since the common line 103 forms storage capacitance and is disposed in only one side of the pixel for electrical connection with the contact part disposed in the adjacent pixel, the horizontal line defect caused by the rubbing defect associated with the common line 103 can be prevented from occurring.

Also, since the common line 103 is disposed in only one side of the pixel, a region of the pixel occupied by the common line 103 can be reduced. Accordingly, the aperture ratio of the LCD device can be prevented from reducing.

A common link line 104 can be disposed in at least one of the upper side and the lower side of the pixel. The common link line 104 electrically connects the common lines 103 disposed in respective pixels with each other. The common link line 104 is in parallel to the gate line 101 and can have a predetermined interval.

The common line 103, the contact part 105, and the common link line 104 can be integrally formed.

A thin film transistor (TFT) Tr is disposed in each pixel. The thin film transistor Tr includes a gate electrode 102, semiconductor patterns 112, a gate dielectric 110, a source electrode 122, and a drain electrode 132. Here, the gate electrode 102 is electrically connected with the gate line 101. The source electrode 122 is electrically connected with the data line 111. Accordingly, the TFT Tr is electrically connected with the gate line 101 and the data line 111. Also, the semiconductor patterns 112 include an active pattern 112a and ohmic contact patterns 112b. The ohmic contact patterns 112b can be interposed between the active pattern 112a and the source electrode 122, and between the active pattern 112a and the drain electrode 132, respectively.

In the drawing, for improving the electrical characteristic of the TFT Tr, the channel shape of the TFT Tr has been illustrated in a U-shape that can improve a channel width, but the channel shape is not limited thereto.

A pixel electrode 124 and the common electrode 125 generating an electric field are disposed in the each pixel to drive LCs.

The pixel electrode 124 can be formed of a conductor that can transmit light. For example, the pixel electrode 124 can be formed of indium-tin-oxide (ITO) or indium-zinc-oxide (IZO) that can transmit light.

The pixel electrode 124 can include first pixel electrodes 124a and a second pixel electrode 124b.

The first pixel electrodes 124a are separated from each other by a predetermined distance. The first pixel electrodes 124a can have a bar shape having a predetermined slope with respect to the gate line 101. To allow the first and second domains D1 and D2 to generate electric fields in different directions, the first pixel electrodes 124a disposed in the first and second domains D1 and D2, respectively, have different slopes with respect to the gate line 101. For example, the first pixel electrodes 124a disposed in the first and second domains D1 and D2, respectively, can have slopes symmetrical with respect to each other.

The second pixel electrode 124b electrically connects the first pixel electrodes 124a with each other. The second pixel electrode 124b can be integrally formed with the first pixel electrodes 124a. A portion of the second pixel electrode 124b is electrically connected with the drain electrode 132 of the TFT Tr. The second pixel electrode 124b can overlap the common electrode 103 with a dielectric layer interposed to form storage capacitance. The dielectric can be a stacked layer of the gate dielectric 110 and the passivation layer 120 which will be described later. To improve the storage capacitance, the second pixel electrode 124b can extend to a portion of the dielectric corresponding to the common link line 104. At this point, the second pixel electrode 124b can have a ' ⊏ 'shape.

The common electrode 125 can be formed of a transparent conductor that can transmit light. The common electrode 125 includes first common electrodes 125a, a second common electrode 125b, and a third common electrode 125c.

The first common electrodes 125a maintain a predetermined interval, and are alternately disposed with the first pixel electrodes 124a. Accordingly, the first common electrodes 125a have different slopes in the first and second domains D1 and D2. For example, the first common electrodes 125a disposed in the first and second domains D1 and D2 can have slopes symmetrical with respect to each other.

When an electrical signal of the TFT Tr is applied to the first pixel electrode 124a, and a common voltage is applied to the first common electrode 125a, a transverse electric field is formed between the first common electrode 125a and the first pixel electrode 124a. At this point, since the first common electrodes 125a and the first pixel electrodes 124a have different slopes in the first and second domains D1 and D2, transverse electric fields have different directions in the first and second domains D1 and D2. For example, the transverse electric fields formed in the first and second domains D1 and D2, respectively, have directions symmetrical with respect to each other.

Accordingly, the LCD device can improve a viewing angle.

The second common electrode 125b is disposed on a boundary between the first and second domains D1 and D2. The second common electrode 125b is electrically connected with the contact part 105. Accordingly, the second common electrode 125b can receive a common voltage from the common line 103.

The first pixel electrodes 124b are disposed on both sides of the second common electrode 125b to generate a transverse electric field. Since both sides of the second common electrode 125b correspond to the first and second domains D1 and D2, respectively, the first pixel electrodes 124a disposed in both sides of the second common electrode 125b have different slopes, respectively. Accordingly, both sides of the second common electrode 125b can have different slopes, respectively. Also, the second common electrode 125b can have a larger size than that of the first common electrode 125a so that it can electrically contact the contact part 105.

The third common electrode 125c electrically connect the first common electrodes 125a with the second common electrode 125b.

The first, second, and third common electrodes 125a, 125b, and 125c can be integrally formed.

In addition, the passivation layer 120 can be further disposed on the substrate 100 including the TFT Tr. The passivation layer 120 can be formed of an insulator protecting the TFT Tr. Accordingly, the pixel electrode 124 and the common electrode 125 can be disposed on the passivation layer 120.

Therefore, the LCD device according to an embodiment provides the pixel electrode 124 and the common electrode 125 formed of a transparent conductor to improve an aperture ratio.

Also, the pixel is divided into at least two domains generating electric fields in different directions, and the common electrode 125 and the common line 103 are allowed to electrically contact each other in the boundary, i.e., a non-transmission region between the domains, so that a viewing angle can be widened and an aperture ratio can be improved.

Also, since the common electrode 125 is electrically connected with the common line 103 provided to the pixel and an adjacent pixel, a horizontal line defect caused by a rubbing defect due to the step difference by the common line 103 can be prevented.

Figure 2A:
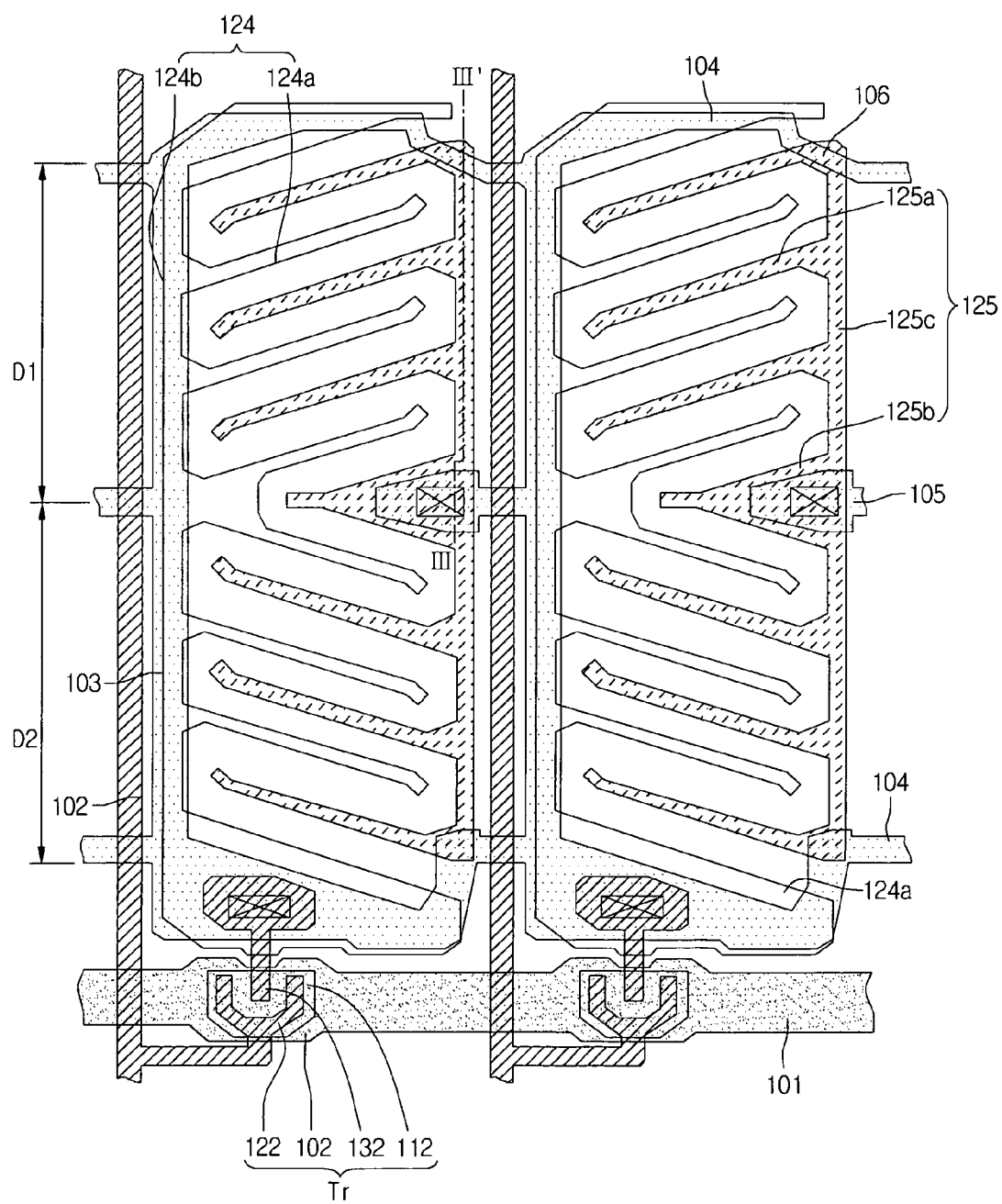
FIG. 2A is a plan view of an LCD device according to another embodiment.
Figure 2B:
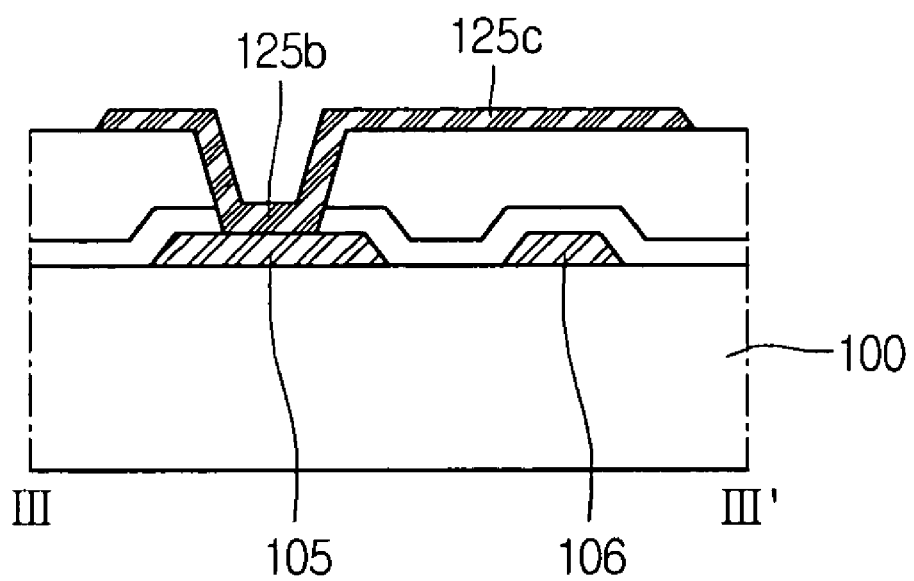
FIG. 2B is a cross-sectional view taken along line III-III' of FIG. 2A.

FIGS. 2A and 2B are views explaining an LCD device according to another embodiment. FIG. 2A is a plan view of an LCD device according to another embodiment, and FIG. 2B is a cross-sectional view taken along line III-III' of FIG. 2A. The another embodiment has the same construction as that of the previous embodiment with only a difference in a repair part. Therefore, descriptions of the same parts as those in the previous embodiment are omitted.

Referring to FIGS. 2A and 2B, the LCD device includes a pixel including first and second domains D1 and D2 generating electric fields in different directions, a pixel electrode 124 and a common electrode 125 disposed in the pixel to generate a transverse electric field, and a contact part 105 contacting the common electrode 125 disposed in the boundary between the first and second domains D1 and D2. The contact part 105 is electrically connected with a common line 103 disposed in the pixel and an adjacent pixel.

The common electrode 125 includes first common electrodes 125a alternately disposed with pixel electrodes 124, a second common electrode 125b disposed on the boundary between the first and second domains D1 and D2, electrically connected with the contact part 105, and a third common electrode 125c electrically connecting the first common electrodes 125a with the second common electrode 125b.

Since the second common electrode 125b and the common line 103 are electrically connected with each other through the contact part 105 disposed in the boundary, i.e., a non-transmission region between the first and second domains D1 and D2, reduction in an aperture ratio is prevented.

Common electrodes 103 disposed in pixels adjacent to each other are electrically connected to each other by a common link line 104. Here, the common lines 103 and the common link line 104 can be integrally formed.

The common link line 104 is in parallel to the gate line 101 and can be disposed on or under, or on and under the pixel.

The common link line 104 can include a repair part 106 overlapping the first common electrode 125a with a gate insulating layer 110 or a stacked layer of the gate insulating layer 110 and a passivation layer 120 interposed. Accordingly, the repair part 106 can be disposed on or under, or on and under the pixel.

Here, in the case where a contact defect occurs between the second common electrode 125b and the contact part 105, a repair process is performed on the repair part 106 to electrically connect the first common electrode 125a with the repair part 106. Accordingly, the common electrode 125 and the common line 103 are electrically connected with each other. That is, in the case where a contact defect occurs between the second common electrode 125b and the contact part 105, the repair process is performed on the repair part 106 to prevent a black point defect of the LCD device from being generated.

Figure 3A:
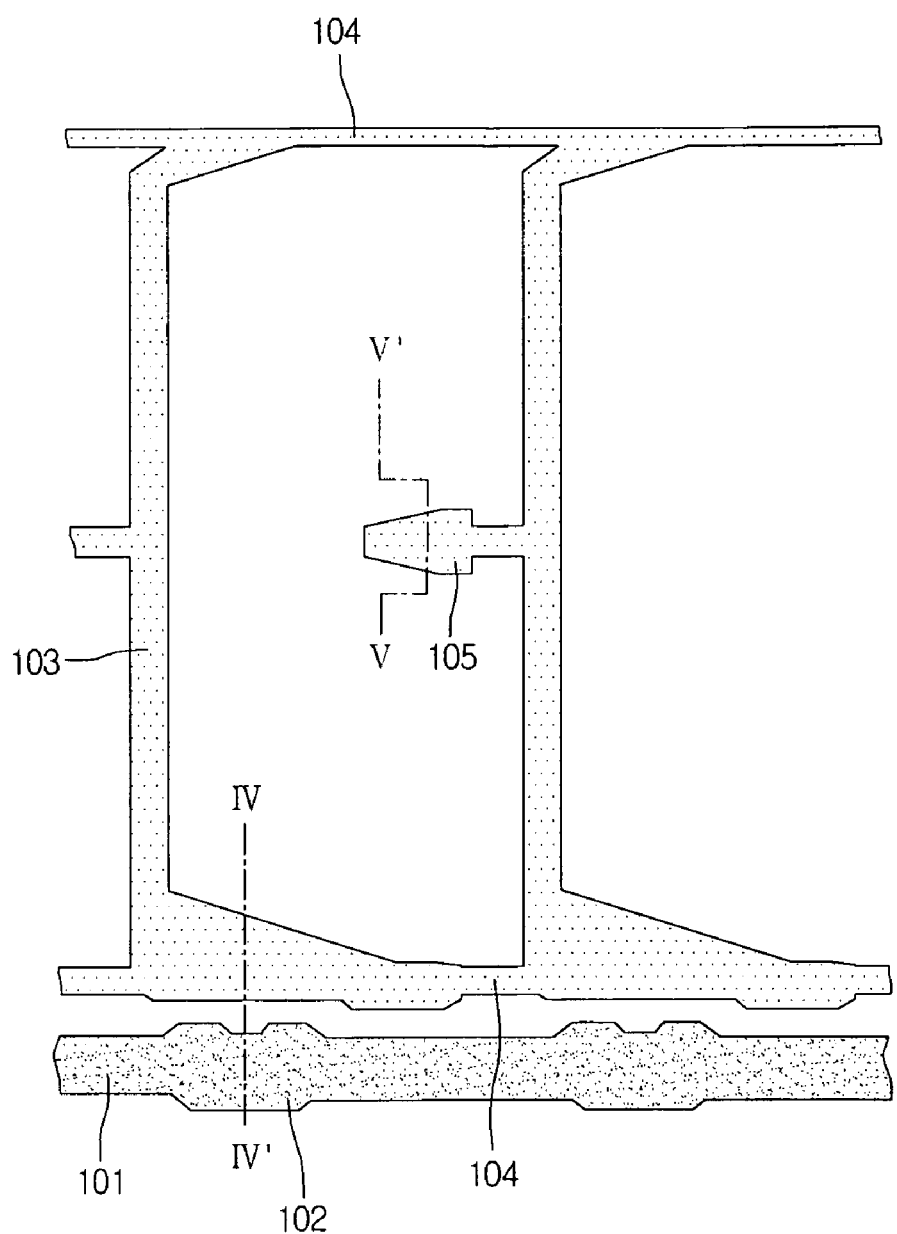
FIGS. 3A to 3C are plan views explaining a method for manufacturing an LCD device according to still another embodiment.
Figure 3B:
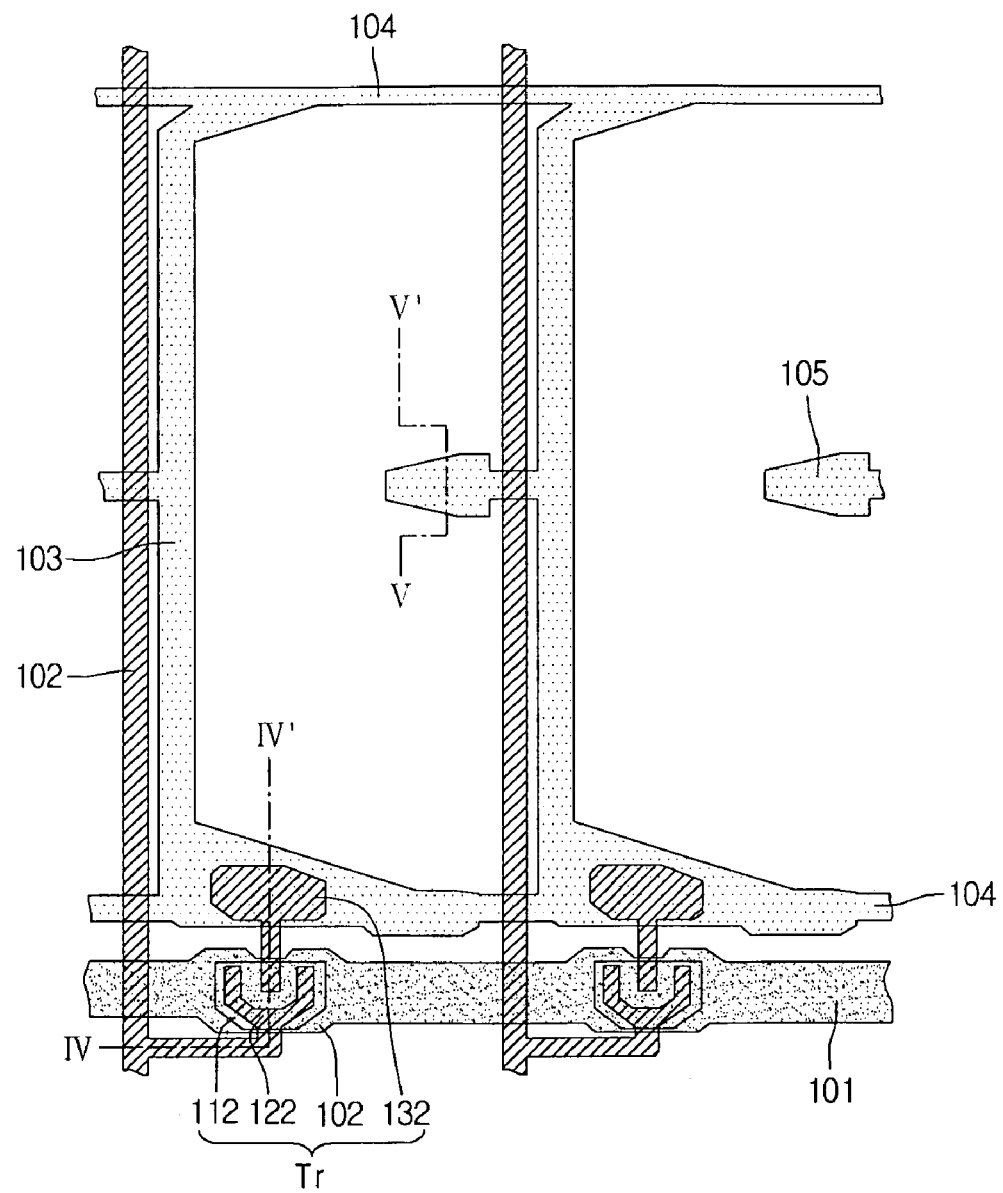
Figure 3C:
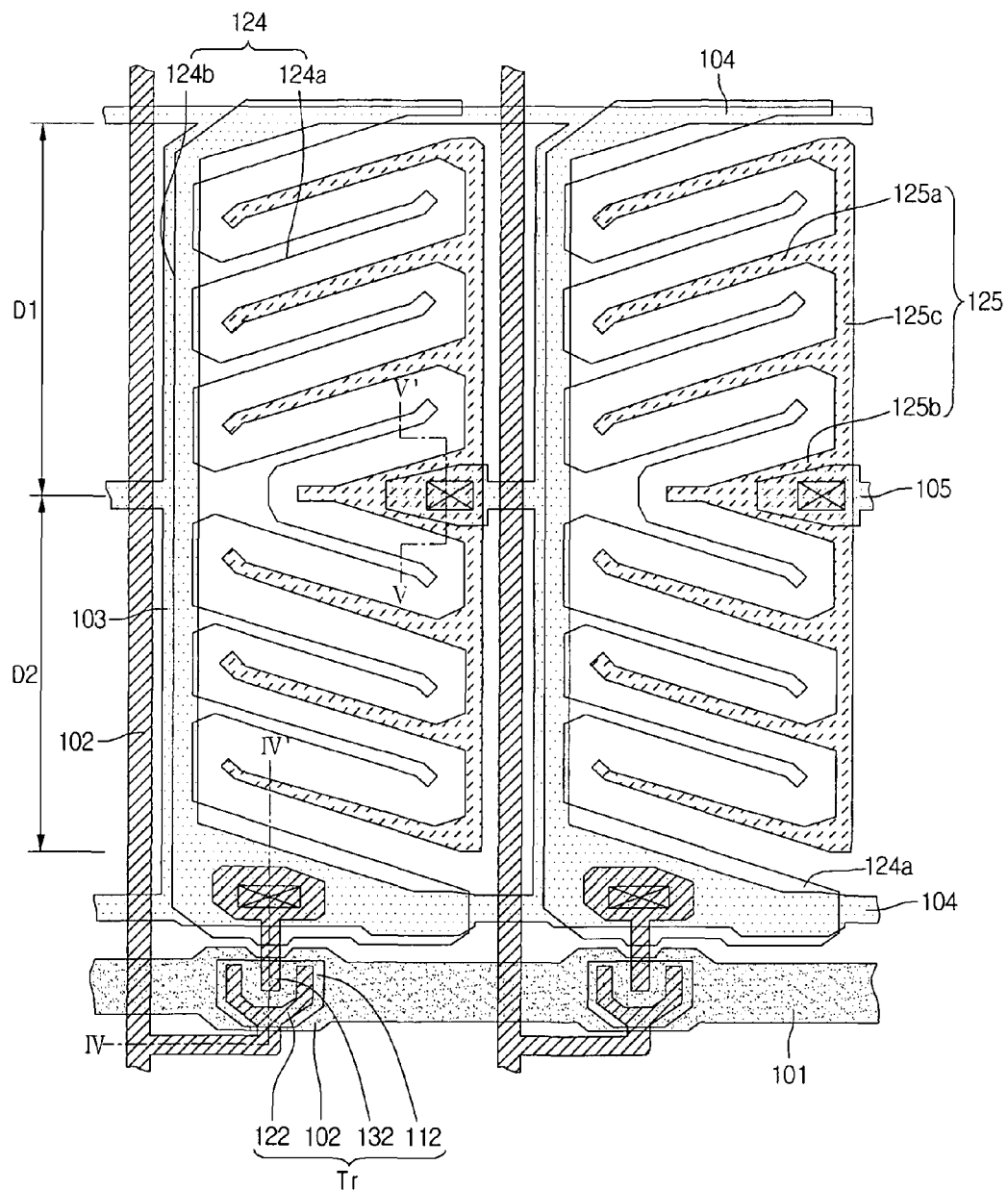

FIGS. 3A to 3C are views explaining a method for manufacturing an LCD device according to still another embodiment.

Figure 4A:
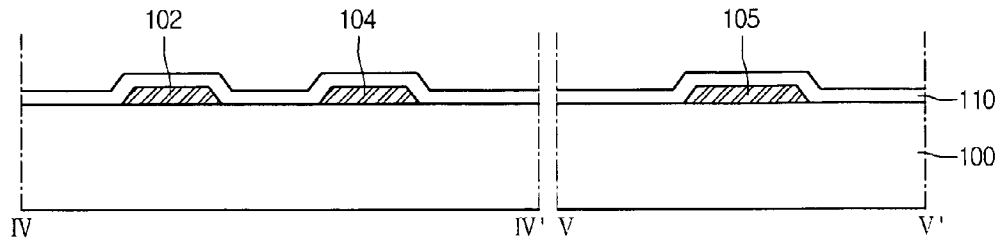
FIGS. 4A to 4C are cross-sectional views taken along lines IV-IV' and V-V' of FIGS. 3A to 3C.
Figure 4B:
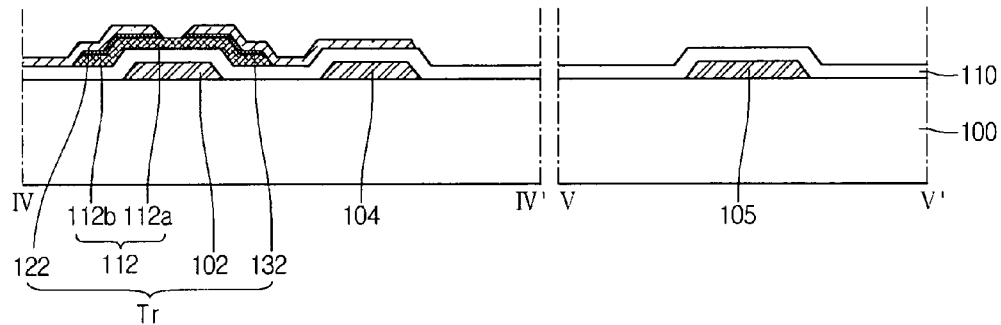
Figure 4C:
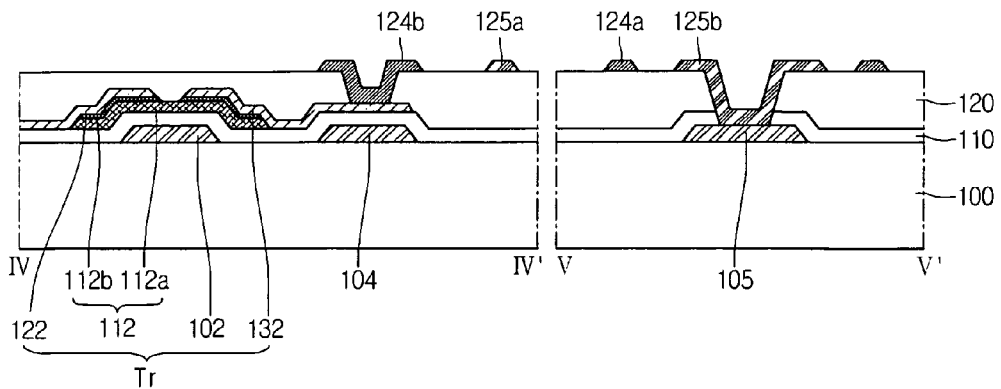

FIGS. 3A to 3C are plan views explaining a method for manufacturing an LCD device according to still another embodiment, and FIGS. 4A to 4C are cross-sectional views taken along lines IV-IV' and V-V' of FIGS. 3A to 3C.

Referring to FIGS. 3A and 4A, a substrate 100 in which a plurality of pixels are defined is provided to provide the LCD device. Each pixel can be divided into at least first and second domains D1 and D2.

The substrate 100 can be formed of a transparent material that can transmit light. For example, the substrate 100 can be formed of glass or plastic.

A conductive layer is formed on the substrate 100, and then etched to form a gate line 101, a gate electrode 102, a common line 103, and a contact part 105.

The conductive layer can be formed using a deposition method. Examples of a material that can be used for the conductive layer include metal. The etching of the conductive layer can be performed by forming photoresist patterns having predetermined patterns on the conductive layer and etching the conductive layer using the photoresist patterns an etch mask.

The gate electrode 102 can be formed in each pixel. The gate line 101 and the gate electrode 102 can be integrally formed.

The contact part 105 can be formed in the boundary between the first and second domains D1 and D2, which is a non-transmission region, to prevent aperture ratio reduction.

The common line 103 can be formed on one side of each pixel. The common line 103 is electrically connected with the contact part 105 disposed in an adjacent pixel. Accordingly, a rubbing defect is prevented from occurring during a subsequent process.

In addition, a common link line 104 electrically connecting the common lines 103 disposed in the plurality of pixels can be further formed. The common line 103, the contact part 105, and the common link line 104 can be integrally formed.

After that, a gate insulating layer 110 is formed on the substrate 100 including the gate line 101, the gate electrode 102, the common line 103, and the contact part 105. The gate insulating layer 110 can be formed using chemical vapor deposition (CVD). The gate dielectric 110 can be formed of one of a silicon oxide layer, a silicon nitride layer, and a stacked layer of these layers.

Referring to FIGS. 3B and 4B, semiconductor patterns 112 are formed on a portion of the gate dielectric 110 corresponding to the gate electrode 102.

To form the semiconductor patterns 112, an amorphous silicon layer and an amorphous silicon layer including impurities are sequentially formed on the gate insulating layer 110. The amorphous silicon layer and the amorphous silicon layer including the impurities can be formed through CVD. After that, the amorphous silicon layer and the amorphous silicon layer including the impurities are etched to form an active pattern 112a corresponding to the gate electrode 102, and ohmic contact patterns 112b exposing a portion of the active pattern 112a corresponding to a channel region. Therefore, the semiconductor pattern 112 including the active pattern 112a and the ohmic contact patterns 112b can be formed.

A source electrode 122 and a drain electrode 132 disposed at both ends of the semiconductor pattern 112, respectively are formed. Simultaneously, a data line 111 crossing the gate line 101 is formed. Here, the gate line 101 and the data line 111 crossing each other can define a pixel.

To form the source electrode 122, the drain electrode 132, and the data line 111, a conductive layer is formed on the substrate 100 including the semiconductor pattern 112. After that, the conductive layer is etched to form the source electrode 122 and the drain electrode 132 disposed on the semiconductor pattern 112 with a channel interposed, and the data line 111. The data line 111 and the source electrode 122 can be integrally formed.

Therefore, the TFT Tr, the gate line 101, the data line 111, the common line 103, the contact part 105, and the common link line 104 can be formed on the substrate 100.

Referring to FIGS. 3C and 4C, a passivation layer 120 is formed on the substrate 100 including the TFT Tr. The passivation layer 120 can be an organic layer, an inorganic layer, or a stacked layer of these layers. Examples of a material that can be used for the organic layer include an acryl-based resin, a polystyrene resin, a polyamide resin, a polyimide resin, a polyarylether resin, a heterocyclic polymer resin, a parylene resin, a benzocyclobutene-based resin, and a polyacrynitril resin. Examples of the inorganic layer include a silicon oxide layer, a silicon nitride layer, and a stacked layer of these layers.

Here, in the case where the passivation layer 120 is an organic layer, the passivation layer 120 can be formed using a slit coating, a spray coating, or a spin coating. On the other hand, in the case where the passivation layer 120 is an inorganic layer, the passivation layer 120 can be formed through CVD.

After that, a first contact hole 105 exposing a portion of the drain electrode 132 is formed in the passivation layer 120. Simultaneously, the passivation layer 120 and the gate dielectric 110 are etched to form a second contact hole exposing the contact part 105.

A pixel electrode 124 electrically connected with the drain electrode 132 through the first contact hole, and a common electrode 125 electrically connected with the contact part 105 through the second contact hole are formed on the passivation layer 120.

To form the pixel electrode 124 and the common electrode 125, a transparent conductive layer is formed on the passivation layer 120. The transparent conductive layer can be formed through a deposition method. Examples of a material that can be used for the transparent conductive layer include ITO and IZO. The transparent conductive layer is etched to form the pixel electrode 124 and the common electrode 125.

The pixel electrode 124 includes first pixel electrodes 124a and a second pixel electrode 124b. The first pixel electrodes 124a are disposed with a predetermined interval, correspond to the first and second domains D1 and D2, respectively, and have different slopes. The second pixel electrode 124b electrically connects the first pixel electrodes 124a. Also, the second pixel electrode 124b overlaps the common line 103 and is disposed on the passivation layer 120 to form storage capacitance.

The common electrode 125 includes first common electrodes 125a alternately disposed with the first pixel electrodes 124a, a second common electrode 125b disposed in the boundary between the first and second domains D1 and D2 and electrically connected with the contact part 105, and a third common electrode 125c electrically connecting the first common electrodes 125a with the second common electrode 125b.

In addition, the common link line 104 can further include a repair part 106 of FIGS. 2A and 2B that overlaps a portion of the second pixel electrode 124b. In the case where a contact defect occurs between the common electrode 125 and the contact part 105, a repair process for connecting the common electrode 125 with the common line 103 can be further performed on the repair part 106.

After that, an alignment layer (not shown) can be further formed on the substrate 100 including the pixel electrode 124 and the common electrode 125. To form the alignment layer, an alignment resin layer is formed on the substrate, and then an alignment process is performed on the alignment resin layer. The alignment process can be performed using a light alignment method or a rubbing method. For example, the alignment layer can have directionality parallel to the gate line 101.

In the case where the alignment process is performed using a rubbing process, the common line 103 is disposed on at least one side of the pixel, so that a rubbing defect due to the height difference of the common line 103 is prevented from occurring, and thus a light leakage defect, for example, a horizontal line defect is prevented from occurring.

After that, a process of attaching an upper substrate to a substrate on which the alignment layer has been formed, a process of forming an LC layer between the substrate and the upper substrate, and a process of assembling external cases are performed to manufacture an LCD device. Here, the order of the attaching process and the LC layer forming process can be changed and is not limited to the order of the embodiment.

Therefore, according to the embodiment, contact between the common electrode 125 and the common line 103 is made in the boundary, i.e., the non-transmission region between the first and second domains D1 and D2 to prevent an aperture ratio from reducing.

Also, since the common line 103 is disposed in an adjacent pixel in electrically connecting the common electrode 125 with the common line 103, aperture ratio reduction is prevented and a horizontal line defect by a rubbing defect can be prevented from occurring.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display device comprising:
   a plurality of pixels including at least first and second domains generating electric fields in different directions, respectively;
   pixel electrodes disposed in the first and second domains, respectively, of each pixel;
   common electrodes disposed in the first and second domains, respectively, of each pixel and a boundary therebetween, and alternately disposed with a part of the pixel electrodes to generate a transverse electric field;
   a contact part electrically connected with the common electrodes in a position corresponding to the boundary;
   a common line electrically connected with the contact part, disposed in the adjacent pixel adjacent to the pixel where the contact part is disposed, and overlapped with the pixel electrodes; and
   common link lines disposed on an upper portion and a lower portion, respectively, of each pixel and overlapped with the pixel electrodes.

2. The liquid crystal display device according to claim 1, wherein the common link lines electrically connect the common lines and are disposed in the pixels adjacent to each other.

3. The liquid crystal display device according to claim 2, wherein the common link lines comprise a repair part overlapping the common electrodes with a dielectric interposed.

4. The liquid crystal display device according to claim 1, wherein each of the pixel electrodes and the common electrodes is formed of a transparent conductor.

5. The liquid crystal display device according to claim 1, wherein pixel electrodes disposed in the first and second domains, respectively, have slopes symmetrical with respect to each other.

6. A liquid crystal display device comprising:
   a substrate including a plurality of pixels each having first and second domains;
   a contact part disposed at the n-th pixel of the plurality of pixels and disposed in a boundary between the first and second domains;
   a common line disposed on one side of the (n+1)-th pixel of the plurality of pixels and electrically connected with the contact part;
   common link lines disposed on an upper portion and a lower portion, respectively, of each pixel;
   a dielectric disposed on the substrate including the common line and the contact part;
   first pixel electrodes disposed with a predetermined interval on the dielectric, disposed in the first and second domains, respectively, to have different slopes, and overlapped with the common link lines;
   a second pixel electrode electrically connecting the first pixel electrodes and overlapping the common line, the second pixel electrode being disposed on the dielectric;
   first common electrodes alternately disposed with the first pixel electrodes;
   a second common electrode disposed in a boundary between the first and second domains, and electrically connected with the contact part; and
   a third common electrode electrically connecting the first common electrodes with the second common electrode.

7. The liquid crystal display device according to claim 6, further comprising:
   a gate line disposed in a neighborhood on the other side of the pixel;
   a data line crossing the gate line, the data line being parallel to the common line; and
   a thin film transistor disposed in the pixel, electrically connected with the gate line and the data line, and electrically connected with the second pixel electrode.

8. The liquid crystal display device according to claim 7, wherein the common line is disposed in parallel to the gate line, and common link lines electrically connecting the common lines are disposed in the pixels adjacent to each other, respectively.

9. The liquid crystal display device according to claim 8, wherein the common link lines comprise each a repair part overlapping a portion of the third common electrode with the dielectric interposed therebetween.

10. The liquid crystal display device according to claim 6, wherein the common line and the contact part are integrally formed.

11. The liquid crystal display device according to claim 6, wherein the first pixel electrodes disposed in the first and second domains, respectively, have slopes symmetrical with respect to each other.

* * * * *